US010164423B2

(12) United States Patent
Kawam et al.

(10) Patent No.: US 10,164,423 B2
(45) Date of Patent: Dec. 25, 2018

(54) METHOD AND SYSTEM FOR GROUND PLANE ISOLATION

(71) Applicant: Microchip Technology Incorporated, Chandler, AZ (US)

(72) Inventors: Eli Kawam, Phoenix, AZ (US); Lynn Kern, Tuscon, AZ (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 607 days.

(21) Appl. No.: 14/828,864

(22) Filed: Aug. 18, 2015

(65) Prior Publication Data

US 2016/0056626 A1    Feb. 25, 2016

Related U.S. Application Data

(60) Provisional application No. 62/039,280, filed on Aug. 19, 2014.

(51) Int. Cl.
| | |
|---|---|
| *H02H 9/04* | (2006.01) |
| *H01R 13/66* | (2006.01) |
| *H01R 25/00* | (2006.01) |
| *H02H 9/08* | (2006.01) |
| *G06F 13/00* | (2006.01) |

(52) U.S. Cl.
CPC ............. *H02H 9/04* (2013.01); *G06F 13/00* (2013.01); *H01R 13/665* (2013.01); *H01R 25/006* (2013.01); *H02H 9/08* (2013.01)

(58) Field of Classification Search
CPC ..... G06F 13/00; H01R 13/665; H01R 25/006; H02H 9/04; H02H 9/08

USPC .......................................................... 361/56
See application file for complete search history.

(56) References Cited

U.S. PATENT DOCUMENTS

| | | | |
|---|---|---|---|
| 5,636,347 A | 6/1997 | Muchnick et al. | ........... 710/302 |
| 6,278,596 B1 | 8/2001 | Simpson | ......................... 361/42 |
| 6,850,397 B2 * | 2/2005 | Russ | ...................... H01L 29/87 257/173 |
| 2005/0180069 A1 | 8/2005 | Tchernobrivets | ............... 361/46 |
| 2008/0144248 A1 | 6/2008 | Crawley et al. | .............. 361/111 |
| 2010/0073837 A1 * | 3/2010 | Predtetchenski | ... G06F 13/4072 361/91.5 |

(Continued)

FOREIGN PATENT DOCUMENTS

CN    1781228 A    5/2006    ............... H02H 9/04

OTHER PUBLICATIONS

International Search Report and Written Opinion, Application No. PCT/US2015/045799, 11 pages, dated Nov. 9, 2015.

(Continued)

*Primary Examiner* — Kevin J Comber
(74) *Attorney, Agent, or Firm* — Slayden Grubert Beard PLLC

(57) ABSTRACT

A system has a plurality of circuits each having an individual ground connection. The system further has a common ground connection connected with each ground connection of each circuit of the plurality of circuits via an associated isolation circuit, wherein each isolation circuit has: an NMOS transistor having a load path connecting the common ground connection with an individual ground connection of an associated circuit, and having a gate connection receiving an activation signal, and a first shunt resistor coupled in parallel with the load path.

26 Claims, 8 Drawing Sheets

(56) References Cited

U.S. PATENT DOCUMENTS

2010/0246074 A1* 9/2010 Venkatasubramanian .................. H01L 27/0251
361/56

OTHER PUBLICATIONS

Chinese Office Action, Application No. 201580040679.X, 10 pages, dated Aug. 23, 2018.

\* cited by examiner

METHOD AND SYSTEM FOR GROUND PLANE ISOLATION

RELATED PATENT APPLICATION

This application claims priority to commonly owned U.S. Provisional Patent Application No. 62/039,280 filed Aug. 19, 2014, which is hereby incorporated by reference herein for all purposes.

TECHNICAL FIELD

The present disclosure relates to a method and system for ground plane isolation, for example in a USB environment. However, the method and system could be used by any other application to protect against inadvertent application of an undesirable voltage, and is therefore not limited to an USB environment.

BACKGROUND

In an automotive environment many electrical hazards exist. For example, various automotive devices and subsystems can generate electromagnetic interference, electrical disturbances, such as electrostatic discharges and others directly or indirectly into the supply voltage wiring.

In the automotive industry, in particular recently the external connector VBAT test has been introduced. Each USB compliant port has generally 4 connection lines Vbus, Gnd, D+ and D−. A relatively high voltage may be connected to any of the connection ports. In a three-port USB system this would require to protect 12 separate connection lines. A user may have no economical solution to protect these 12 lines in the 3×USB micro connector.

Since there are multiple ports and multiple contacts per port for this test, the only common connection to isolate this test condition is to isolate the entire board ground through a MOSFET switch. Initially a single MOSFET isolation scheme has been tested whereby it was attempted to isolate the entire module from ground. Unfortunately, due to interaction and interconnection of the three functional sections on the module (in one embodiment, a DC-DC converter, USB HUB component and other components), this solution does not work. A similar approach could be used to protect many ports associated with an MCU or any analog, digital, or interface device. By detecting excess current in the ground return of said device and "clamping" the outputs of said device to its local ground connection, the possibility exists to protect the device from external voltage exposure.

SUMMARY

Hence, there is a need for an improved protection circuit. According to an embodiment, a system may comprise a plurality of circuits each having an individual ground connection, wherein the system further comprises a common ground connection connected with each ground connection of each circuit of the plurality of circuits via an associated isolation circuit, wherein each isolation circuit comprises: an NMOS transistor having a load path connecting the common ground connection with an individual ground connection of an associated circuit, and having a gate connection receiving an activation signal; and a first shunt resistor coupled in parallel with the load path.

According to a further embodiment, at least one of the circuits can be a USB circuit. According to a further embodiment, at least one of the circuits can be a DC-DC converter. According to a further embodiment, at least one isolation circuit may further comprise a PMOS transistor having a load path connected between a supply voltage of an associated USB circuit and a transient voltage suppressing device coupling the load path with the individual ground connection, and a second shunt resistor coupled between the supply voltage and the individual ground connection. According to a further embodiment, the transient voltage suppressing device can be a transient voltage suppressing diode. According to a further embodiment, the system may further comprise a first zener diode coupled between a gate of the PMOS transistor an the supply voltage and a second zener diode coupled between the gate and the common ground connection. According to a further embodiment, the second zener diode can be connected in series with a resistor. According to a further embodiment, a resistor can be coupled in parallel to the first zener diode. According to a further embodiment, the first shunt resistor may have a resistance between about 10 kOhm and 1 MOhm. According to a further embodiment, the system may further comprise an operational amplifier having an input coupled with the first shunt resistor, wherein an output of the operational amplifier controls the NMOS transistor. According to a further embodiment, the system may further comprise another NMOS transistor having a load path coupled between the gate of the NMOS transistor and common ground, wherein the gate of the another NMOS transistor is coupled with the output of the operational amplifier. According to a further embodiment, the system may further comprise a plurality signals coupled through an OR circuit with the gate of the another NMOS transistor. According to a further embodiment, the OR circuit can be formed by a plurality of diodes connected with the gate of the NMOS transistor, wherein each of the plurality of signals is fed to one of the plurality of diodes. According to a further embodiment, at least one of the circuits can be a USB power controller.

According to another embodiment, a protection circuit for an integrated circuit device may comprise: an NMOS transistor having a load path connecting a common ground connection with an individual ground connection of the integrated circuit device, and having a gate connection receiving an activation signal; and a first shunt resistor coupled in parallel with the load path.

According to a further embodiment of the protection circuit, the protection circuit may further comprise a PMOS transistor having a load path connected between a supply voltage of the integrated circuit device and a transient voltage suppressing device coupling the load path with the individual ground connection, and a second shunt resistor coupled between the supply voltage and the individual ground connection. According to a further embodiment of the protection circuit, the protection circuit may further comprise an operational amplifier having an input coupled with the first shunt resistor, wherein an output of the operational amplifier controls the NMOS transistor. According to a further embodiment of the protection circuit, the protection circuit may further comprise another NMOS transistor having a load path coupled between the gate of the NMOS transistor and common ground, wherein the gate of the another NMOS transistor is coupled with the output of the operational amplifier. According to a further embodiment of the protection circuit, the protection circuit may further comprise a plurality signals coupled through an OR circuit with the gate of the another NMOS transistor. According to a further embodiment of the protection circuit, the OR circuit can be formed by a plurality of diodes connected with the gate of the NMOS transistor, wherein each of the plurality of signals is fed to one of the plurality of diodes. According to a further embodiment of the protection circuit, the integrated circuit device can be a USB hub, a USB power controller or a DC-DC-converter. According to a further embodiment of the protection circuit, the transient voltage suppressing device can be a transient voltage suppressing diode. According to a further embodiment of the protection circuit, the protection circuit may further comprise a first zener diode coupled between a gate of the PMOS transistor an the supply voltage and a second zener diode coupled between the gate and the common ground connection. According to a further embodiment of the protection circuit, the second zener diode can be connected in series with a resistor. According to a further embodiment of the protection circuit, a resistor can be coupled in parallel to the first zener diode. According to a further embodiment of the protection circuit, the first shunt resistor may have a resistance of about 10 kOhm or about 1 MOhm. According to a further embodiment of the protection circuit, the protection circuit may further comprise a plurality of transient voltage suppressing (TVS) device, each TVS device coupled between an external connection and a respective individual ground connection.

DETAILED DESCRIPTION

According to various embodiments, ground switching/isolation can be used as a means of circuit protection/isolation for many types of devices and modules, in particular in automotive applications, such as for example USB modules. However, the protection circuit can be applied to other devices and modules that comprise external connectors. According to various embodiments, ground switching/isolation is a very economical means of preventing damaging levels of current from flowing through components rated for voltages much lower than testing requires. Isolation of each line would otherwise require, for example, in some embodiments at least 9 separate MOSFET driver circuits. In the following, the protection circuit will be discussed in combination with a USB module. However, as stated above, the embodiments of the present application are not limited to USB technology but can be applied to various other circuits that require protection.

A USB module for automotive applications may comprise typically a USB hub with at least one up-stream and at least one down-stream port and may also have one or more USB charging ports. According to one embodiment, for example, three USB connectors are externally accessible on an automotive USB module, a USB data port and two USB charging ports, each provide Vbus, Gnd, D+ and D− connections.

An exemplary survival test needs to permit the board to sustain the application of, for example, 13.5V or greater depending on the application to each of these connections for 30 seconds without causing fire or flame. Following this exposure, the module containing a USB HUB part and 2 other parts needs to function normally. Previous testing of an unprotected board using conventional parts, may cause failure leading to flame and smoke. Generally, fusing and output isolation would be the obvious choices to provide protection. However, fuses are too slow and multiple MOSFET output isolation would be cost prohibitive. Floating the ground connections with shunts and TVS parts or components with equivalent functionality according to various embodiments, meets the requirement of not permitting the ground potential of exceeding 5V during isolation.

Figure 1:
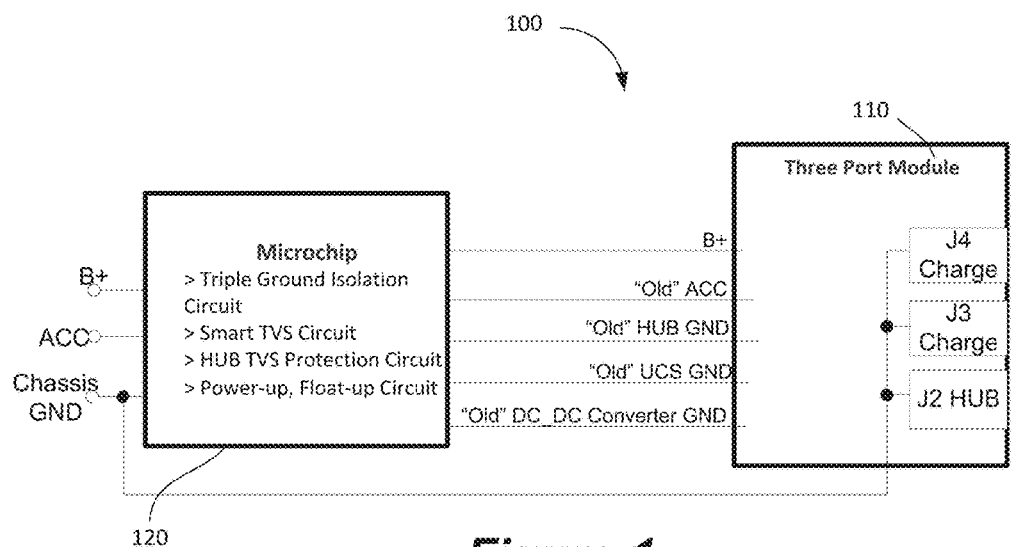
FIG. 1 shows a block diagram of a circuit comprising a protection circuit and a USB module according to an embodiment.

According to various embodiments, a 3 section prototype may be equipped with three NFET isolation circuits. FIG. 1 shows a block diagram with a three-port USB module 110 having three externally accessible USB ports J2, J3 and J4. However, other configurations can be designed. The module 110 further comprises a battery connection B+, an activation signal input "Old ACC", and three separate ground connections "Old Hub Gnd", "Old UCS Gnd", "Old DC-DC Gnd" for three modules, namely a DC-DC converter module, a USB port power controller module and a USB hub module. As mentioned above, the protection circuit can also be used for other types of electronic modules and is not restricted to USB applications.

Figure 2:
FIG. 2 shows an exemplary embodiment of a USB module.

As stated above, the USB hub module 110 can comprise various devices as shown for example in FIG. 2. For example a DC-DC converter 210 for providing a 5V supply voltage, a USB hub controller 220 and one or more USB port power controller 230 can be arranged within module 110. The power port controller can be, for example, a UCS81003 and the hub controller can be a USB82642, all manufactured by the Assignee of the present application. The USB hub controller may comprise one or more externally accessible downstream USB data ports and an internal upstream port. However, other USB controller devices may be implemented. Thus, according to various embodiments, the USB module provides for a USB supply voltage through DC-DC converter, one or more external USB data ports, and one or more external USB charging ports. Other configurations may not include a charging port or one or more combined data charging port controllers. Also, controllers for multiple ports may be used according to other implementations.

As shown in FIG. 1, a protection circuit 150 is switched between USB module 110 and the actual battery connection B+, the activation signal ACC and the chassis ground of the vehicle. This protection circuit 150 can provide for a triple ground isolation circuit, a smart transient voltage suppression (TVS) protection circuit, a hub TVS protection circuit and power-up, float-up circuit.

Figure 3:
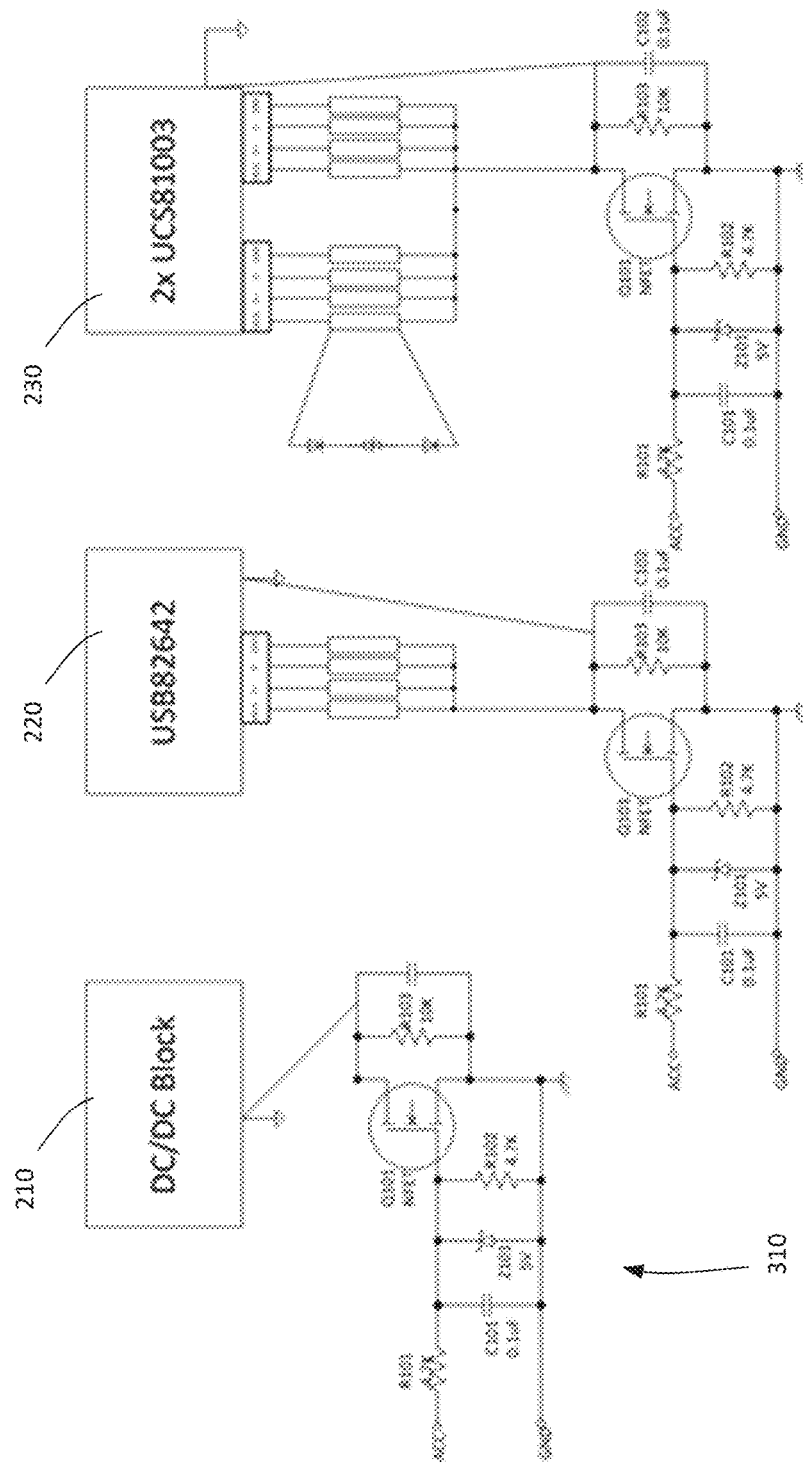
FIG. 3 shows various protection circuits as applied to components of the module.

FIG. 3 shows examples of how the protection circuits 310 are applied to each device in module 110. Each protection circuit 310 is arranged between the vehicle chassis ground and the respective ground of the device which is to be protected. Each protection circuit 310 comprises an NFET Q101 having source drain path connecting the vehicle chassis ground and the respective ground of the device. According to some embodiments, a shunt resistor R103, for example a 10 kOhm shunt resistor, can be switched in parallel with the source-drain path of Q101. Furthermore, a zener diode Z101, a resistor 102, and a capacitor C101 are each coupled between the gate of Q101 and the chassis ground. The activation signal ACC can be fed to the gate of Q101 through resistor R101.

According to various embodiments, the protection circuits 310 are used to decouple the chassis ground from the individual ground when the module 110 is not activated. Thus, as shown in FIG. 2, each individual ground of device 210, 220, 230 is connected with chassis ground through low resistance NFET transistors Q101. In addition, the individual port connections can be tied to the switching transistor Q101 as well, according to some embodiments as shown in FIG. 3. To this end, individual transient voltage suppression diodes or any component with equivalent functionality could be connected between each USB port connection and the individual ground.

Figure 4:
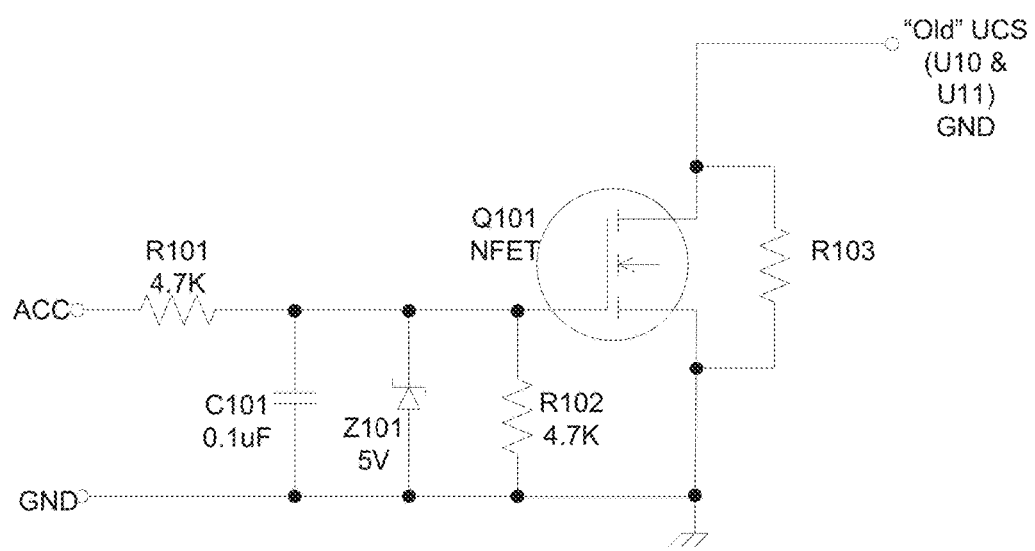
FIG. 4 shows a single protection circuit according to an embodiment.
Figure 5:
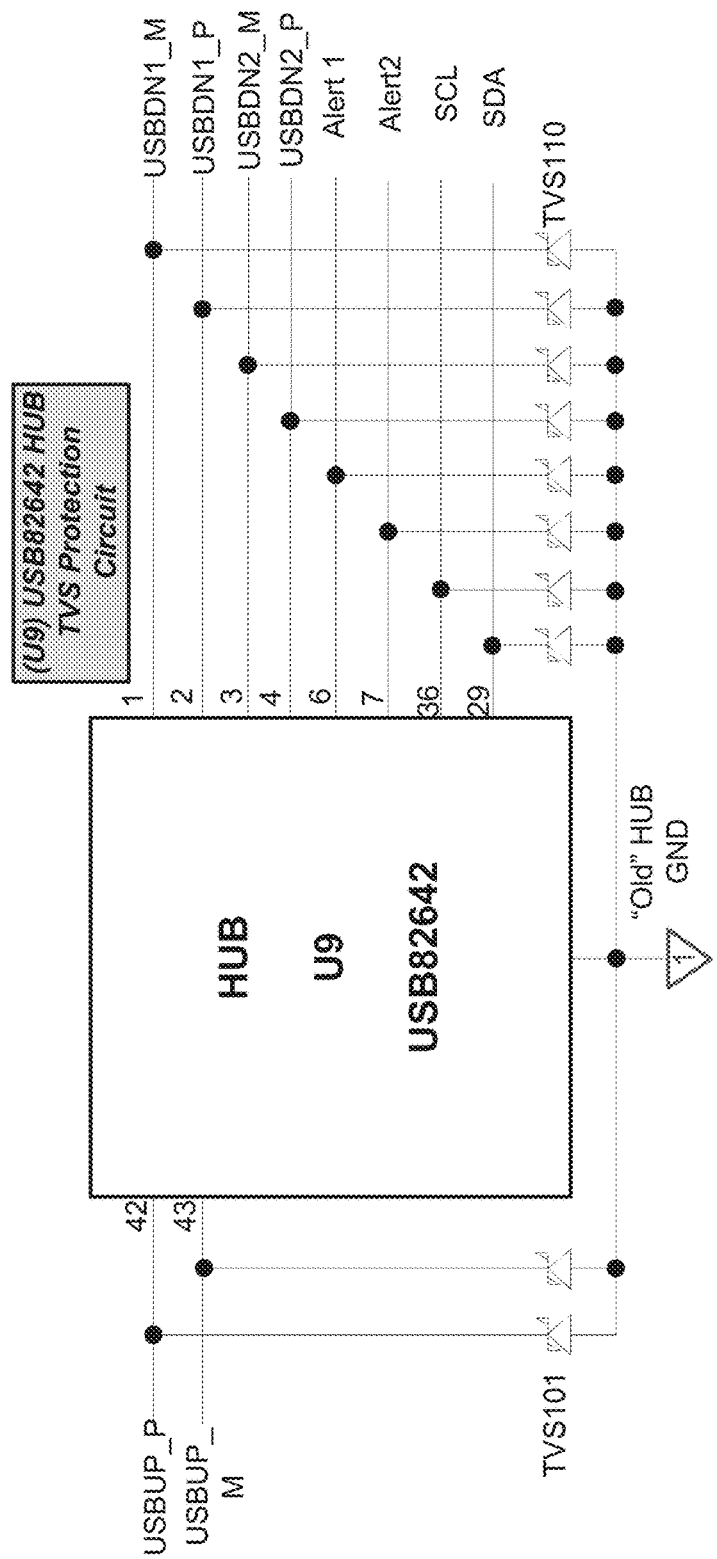
FIG. 5 shows additional protection measurements for a component of the USB module.

FIG. 4 shows a single protection circuit as used for example for the DC-DC converter. However, it may also be used for the USB hub and/or the USB power controller. For the DC-DC converter 210, the resistor R103 can be configured as 100 kOhm wherein for the USB power controller 230, resistor 103 can be 1 MOhm as shown. FIG. 5 shows the individual line protection with TVS diodes TVS110 for the USB hub or any other USB controller.

Figure 6:
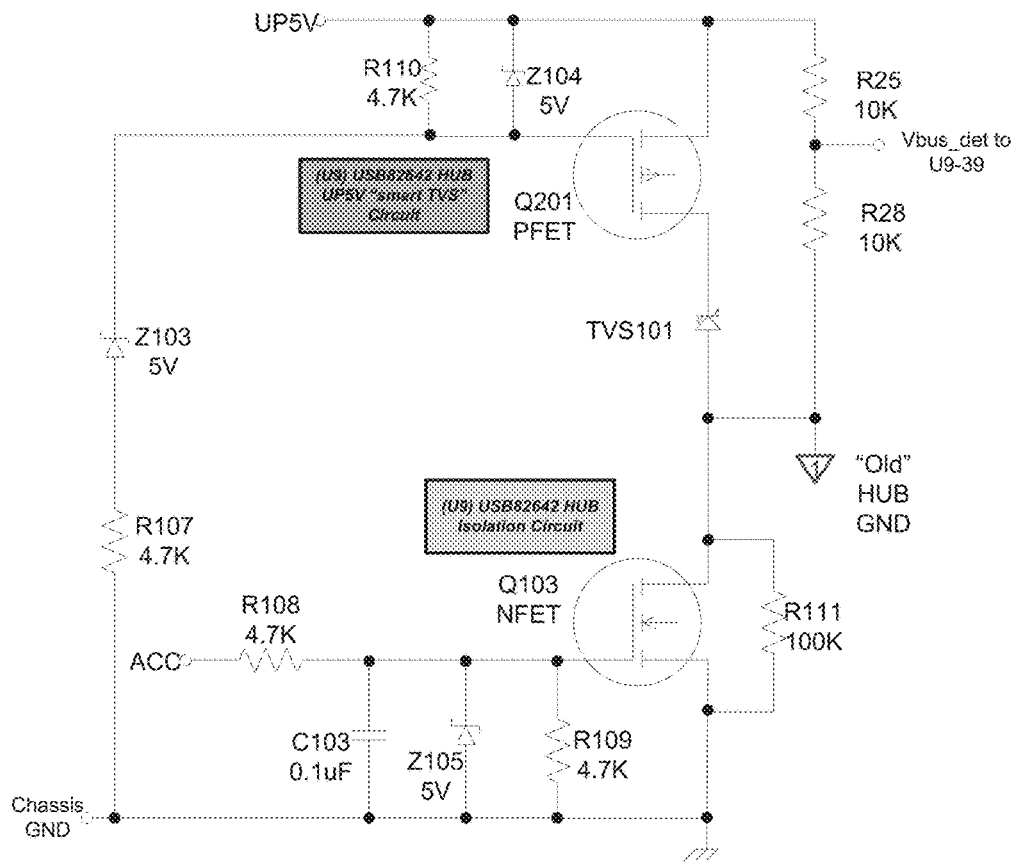
FIG. 6 shows another embodiment of a protection circuit.

As shown in FIG. 6, according to some embodiments, the protection circuit for the USB hub controller 220 may further comprise a PFET circuit with PFET Q201. This additional circuit is used to bypass and protect the HUB Vbus line during the 13.5V exposure event. This circuit is referred to as a "smart TVS (transient voltage supresser)." A so-called "smart TVS" is a TVS circuit that pulls in the TVS clamp function only during the offending voltage event. This is required since the HUB Vbus line cannot function with the normal permanent "load" of the TVS. The permanent TVS load creates a leakage current that disrupts the normal HUB function. With a PFET, the TVS is effectively isolated and conditionally applied to the Vbus line only when the offending voltage is applied.

The various embodiments utilize a high current, low Rds_on N-channel MOSFETs as switches between the board grounds and the chassis ground connection. The proposed MOSFETs will be activated, for example, by vehicle accessory power signal ACC, effectively shorting the board grounds back to the chassis ground. This is applicable to the "ACC off" case. In the "ACC on" case, an op-amp can be used in conjunction with the main NFET using the Rds_on of the NFET as a current sensor as will be explained in more detail with respect to FIGS. 8A and 8B. When the GND pin of the USB connector has the offending voltage applied, excess current flows in the Rds_on of the NFET producing an elevated voltage drop across said NFET. By selecting a proper gain value for the op-amp, a threshold current can be measured as a voltage is induced across the isolation NFET. The output of said op-amp is then used in a feedback circuit as part of a wired OR configuration to turn-off the NFET and isolate the circuit. The wired OR circuit is formed from measuring excess current in the chassis ground or excess voltage on either of the Vbus, V+ or V– lines. All 4 of these are summed at the gate of the Blow Off NFET. This NFET controls the main chassis ground isolation NFET(s) producing the effective isolation.

Thus, according to various embodiments, each section of the design can be isolated by part geometry. A diode "OR" circuit is used to detect VBAT contact, and protect each plane independently. As shown in FIG. 6, isolated grounds are provided for each block with respective isolation resistors, for example, a 100 kOhm current limiting resistors R111 to true ground. The resistor value depends on the respective application and may vary, for example, 10 kOhm or 1 MOhm or any other suitable value may be used. As shown in FIGS. 4 and 6, the NFET transistor Q101 or Q103 is used to bypass resistor R103 or R111, respectively. For example, a 30 mOhm NFETs can be used to connect grounds in normal operation. According to some embodiments, 2.8V TVS protection diodes are provide for the 3.3V supply voltage of the USB hub controller 220. A 5V transient voltage suppression (TVS) protection diode can be provided for the USB power controller 230 and the DC/DC blocks. This solution provides for current limiting of each isolation plane to ground in the off condition and a minimal component count.

Figure 7:
FIG. 7 shows an additional circuit within the protection circuit.

As depicted in the various figures, in an effort to maintain a relatively low voltage on the board ground and not bias the USB device ESD structures, shunted MOSFETs are used for protection. As shown in FIG. 5, further protection can be accomplished by adding 2.8V TVS diodes to the USB HUB component 220, and shunt resistors across each MOSFET. This will maintain the board ground planes at ~5V and the ESD structures at ~7V with a current limit of ~0.1 mA. FIG. 7 shows a circuit that may be required for USB ports to float up from zero Volts to about 5 Volts vs. down from 13.5 Volts to about 5 Volts at power up from the battery voltage at B+ when the accessory signal ACC is off. The circuit comprises a capacitor coupling the the accessory signal and the battery supply voltage B+.

Figure 8A:
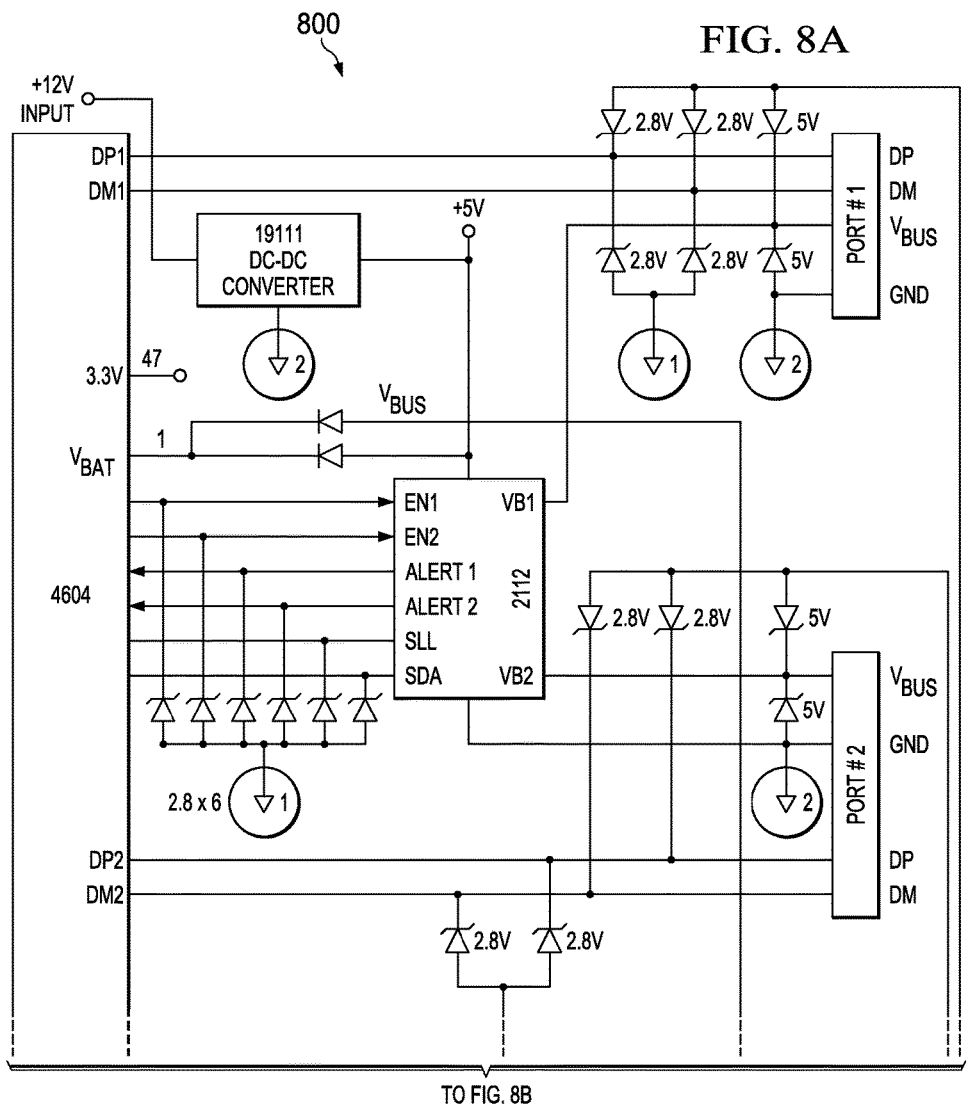
FIGS. 8A and 8B show another embodiment of a protection circuit.
Figure 8B:
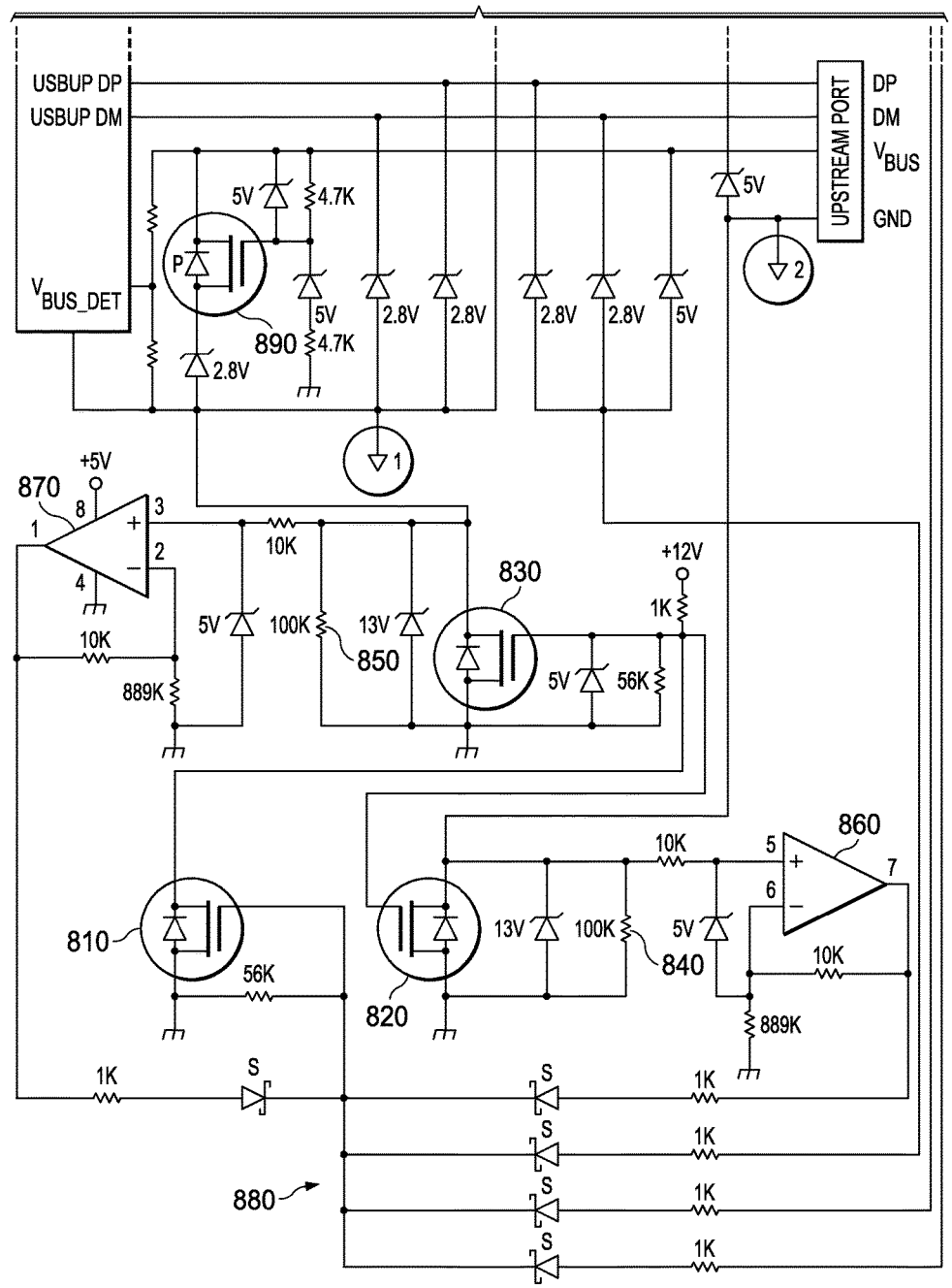

FIGS. 8A and 8B show another example of a protection circuit 800 with over-current protection as discussed above. The circuit comprises a hub 4604, a DC-DC converter USB power controller and three USB ports. Transistors 890 and 830 correspond to transistors Q201 and Q103 of FIG. 6, respectively. Transistor 820 corresponds to transistor Q101 of FIG. 4. Furthermore, a plurality of TVS protection diodes are shown.

Transistor 820 and 830 each provide for a decoupling and coupling with chassis ground. In this circuit a 100 k isolation resistor 840, 850 are provided and will be bypassed if the transistors 820 and 830 are turned on through transistor 810. The embodiment shows how operational amplifiers 860, 870 as discussed above can be used to control transistor 810. The OR control circuit is formed by a plurality of Schottky diodes connected in series with a resistor that connect with the gate of transistor 810. As shown in FIGS. 8A and 8B, a 5 way OR gate is formed by these series connected diode resistor combinations.

Figure 9:
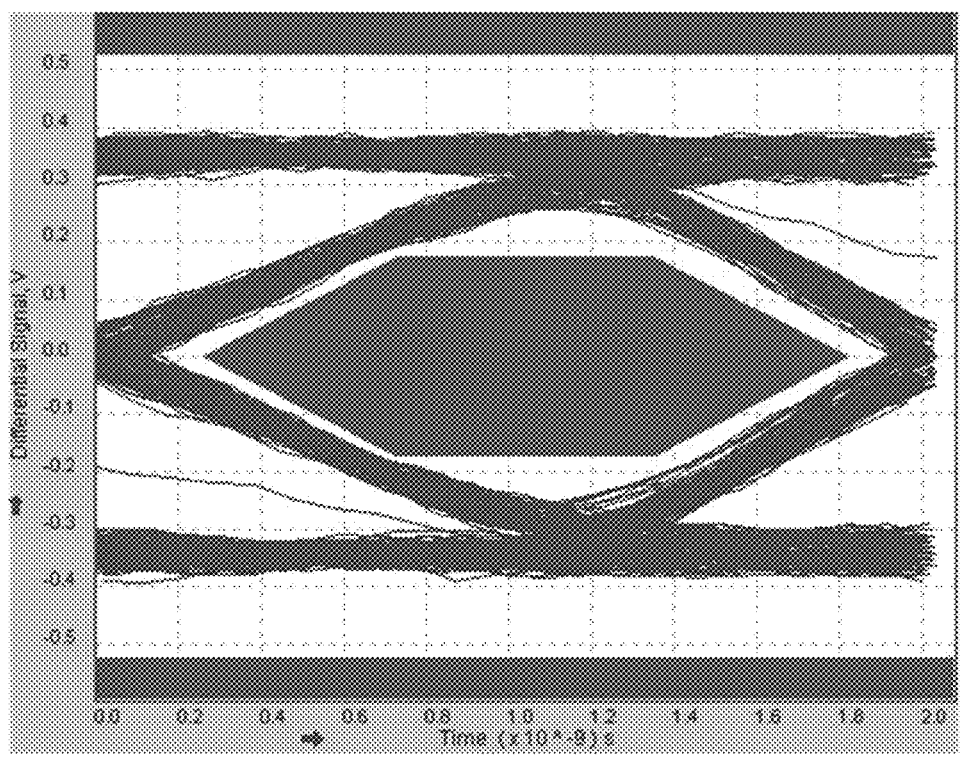
FIG. 9 shows an eye diagram.

FIG. 9 shows a far end eye diagram of an upstream to downstream high speed transfer. Thus, FIG. 9 shows that the protected system has the desired end-to-end performance and system integrity.

The proposed solution furthermore allows the protected module to survive a 3.5V Vbatt test without causing smoke, fire, or flames. It provides for a low cost and low component count solution, and solves the USB hub isolation problem. Furthermore, it returns the module to normal configuration with the accessory power signal ACC on.

The invention claimed is:

1. A system comprising a plurality of circuits each having an individual ground connection, the system further comprising:

a common ground connection connected with each ground connection of each circuit of said plurality of circuits via an associated isolation circuit, wherein at least one of said isolation circuit comprises:

an NMOS transistor having a load path connecting said common ground connection with an individual ground connection of an associated circuit, and having a gate connection coupled with an input terminal receiving an external activation signal;

a first shunt resistor coupled directly with a source and drain connection, respectively of the NMOS transistor; and a PMOS transistor having a load path connected between a supply voltage and a transient voltage suppressing device coupling said load path with said individual ground connection, and a second shunt resistor coupled between said supply voltage and said individual ground connection.

2. The system according to claim 1, wherein at least one of the circuits is a USB circuit.

3. The system according to claim 2, wherein at least one of the circuits is a DC-DC converter.

4. The system according to claim 3, wherein at least one of the circuits is a USB power controller.

5. The system according to claim 1, wherein the supply voltage is a supply voltage of an associated USB circuit.

6. The system according to claim 1, wherein the transient voltage suppressing device is a transient voltage suppressing diode.

7. The system according to claim 1, further comprising a first zener diode coupled between a gate of the PMOS transistor and the supply voltage and a second zener diode coupled between the gate and the common ground connection.

8. The system according to claim 7, wherein the second zener diode is connected in series with a resistor.

9. The system according to claim 7, wherein a resistor is coupled in parallel to the first zener diode.

10. The system according to claim 1, wherein the first shunt resistor has a resistance between about 10 kOhm and 1 MOhm.

11. The system according to claim 1, further comprising an operational amplifier having an input coupled with the first shunt resistor, wherein an output of the operational amplifier controls said NMOS transistor.

12. The system according to claim 11, further comprising another NMOS transistor having a load path coupled between the gate of the NMOS transistor and common ground, wherein the gate of the another NMOS transistor is coupled with the output of the operational amplifier.

13. The system according to claim 12, further comprising a plurality signals coupled through an OR circuit with the gate of the another NMOS transistor.

14. The system according to claim 13, wherein the OR circuit is formed by a plurality of diodes connected with the gate of the NMOS transistor, wherein each of the plurality of signals is fed to one of the plurality of diodes.

15. A protection circuit for an integrated circuit device, comprising:

an NMOS transistor having a load path connecting a common ground connection with an individual ground connection of the integrated circuit device, and having a gate connection receiving an external activation signal;

a first shunt resistor directly in parallel with the load path of the NMOS transistor and a PMOS transistor having a load path connected between a supply voltage of said integrated circuit device and a transient voltage suppressing device coupling said load path with said individual ground connection, and a second shunt resistor coupled between said supply voltage and said individual ground connection.

16. The protection circuit according to claim 15, further comprising an operational amplifier having an input coupled with the first shunt resistor, wherein an output of the operational amplifier controls said NMOS transistor.

17. The protection circuit according to claim 16, further comprising another NMOS transistor having a load path coupled between the gate of the NMOS transistor and common ground, wherein the gate of the another NMOS transistor is coupled with the output of the operational amplifier.

18. The protection circuit according to claim 17, further comprising a plurality signals coupled through an OR circuit with the gate of the another NMOS transistor.

19. The protection circuit according to claim 18, wherein the OR circuit is formed by a plurality of diodes connected with the gate of the NMOS transistor, wherein each of the plurality of signals is fed to one of the plurality of diodes.

20. The protection circuit according to claim 15, wherein the integrated circuit device is a USB hub, a USB power controller or a DC-DC-converter.

21. The protection circuit according to claim 15, wherein the transient voltage suppressing device is a transient voltage suppressing diode.

22. The protection circuit according to claim 15, further comprising a first zener diode coupled between a gate of the PMOS transistor an the supply voltage and a second zener diode coupled between the gate and the common ground connection.

23. The protection circuit according to claim 22, wherein the second zener diode is connected in series with a resistor.

24. The protection circuit according to claim 22, wherein a resistor is coupled in parallel to the first zener diode.

25. The protection circuit according to claim 15, wherein the first shunt resistor has a resistance of about 10 kOhm or about 1 MOhm.

26. The system according to claim 15, further comprising a plurality of transient voltage suppressing (TVS) device, each TVS device coupled between an external connection and a respective individual ground connection.

* * * * *